Patented Aug. 25, 1942

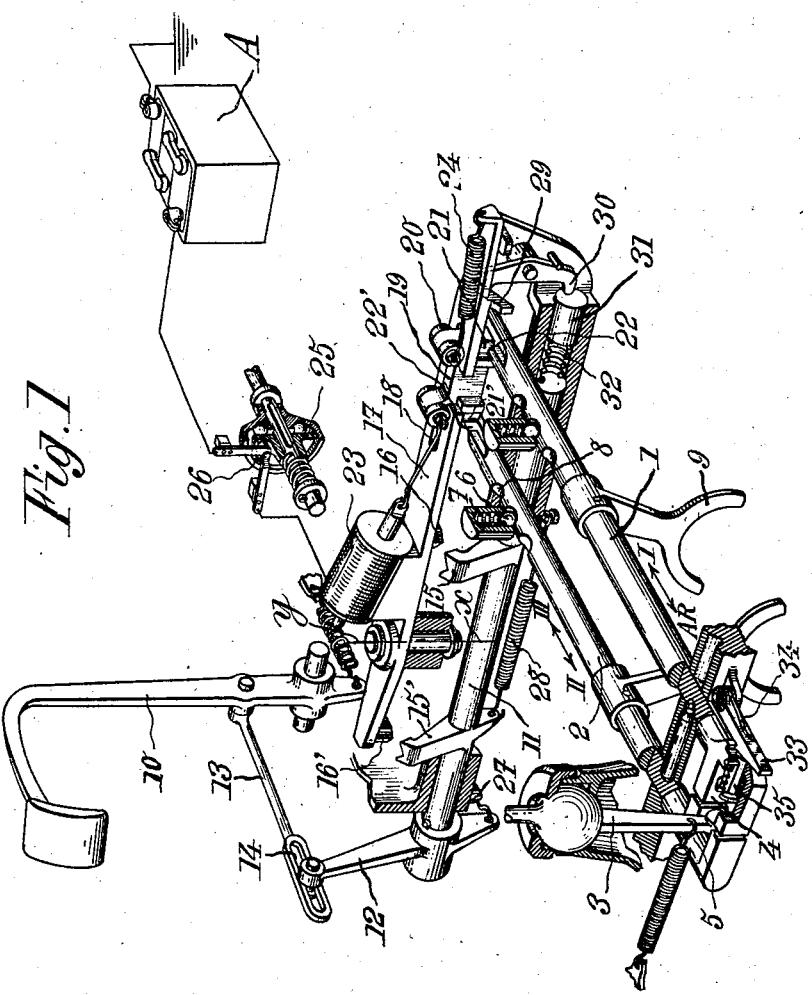

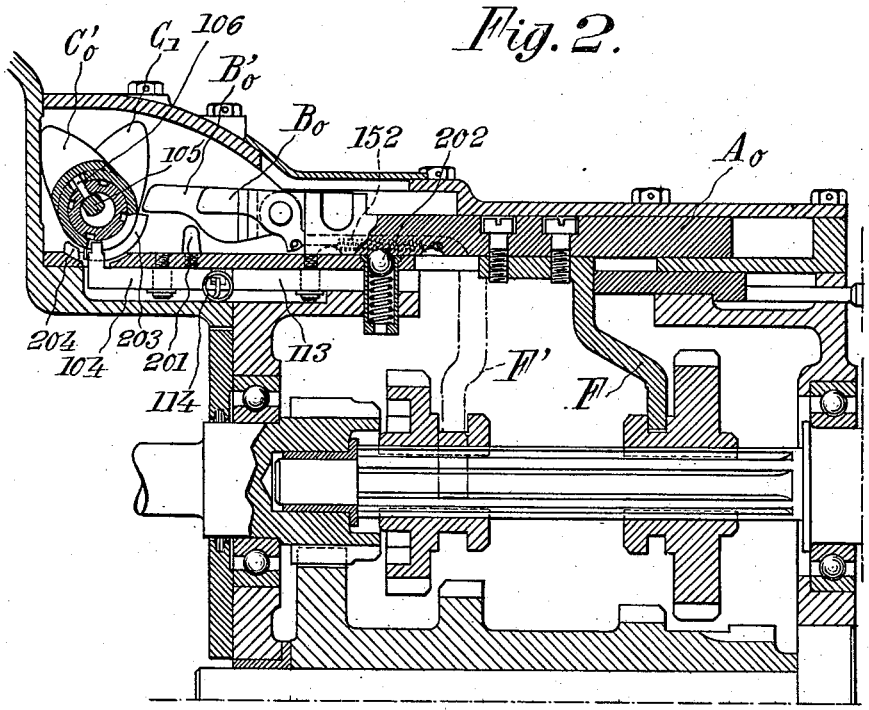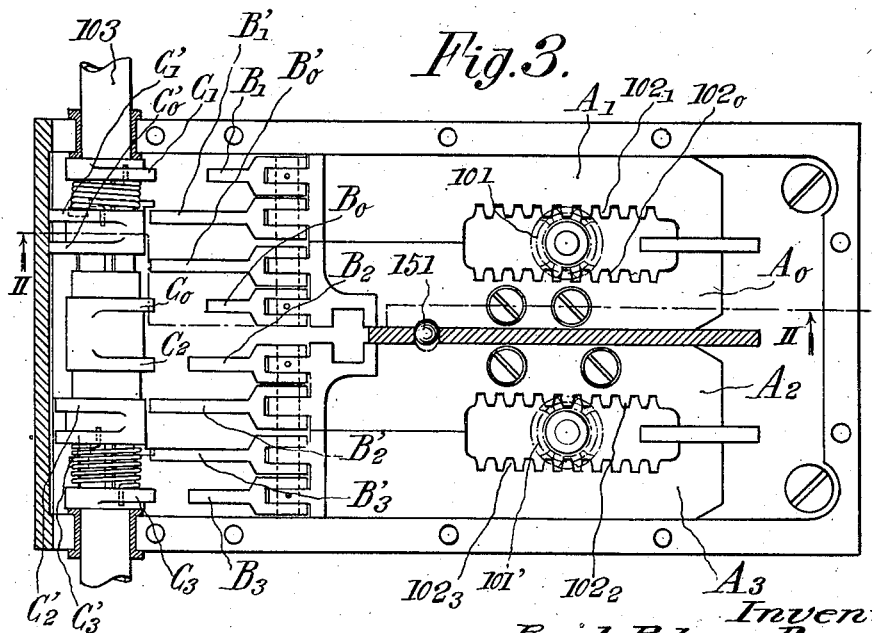

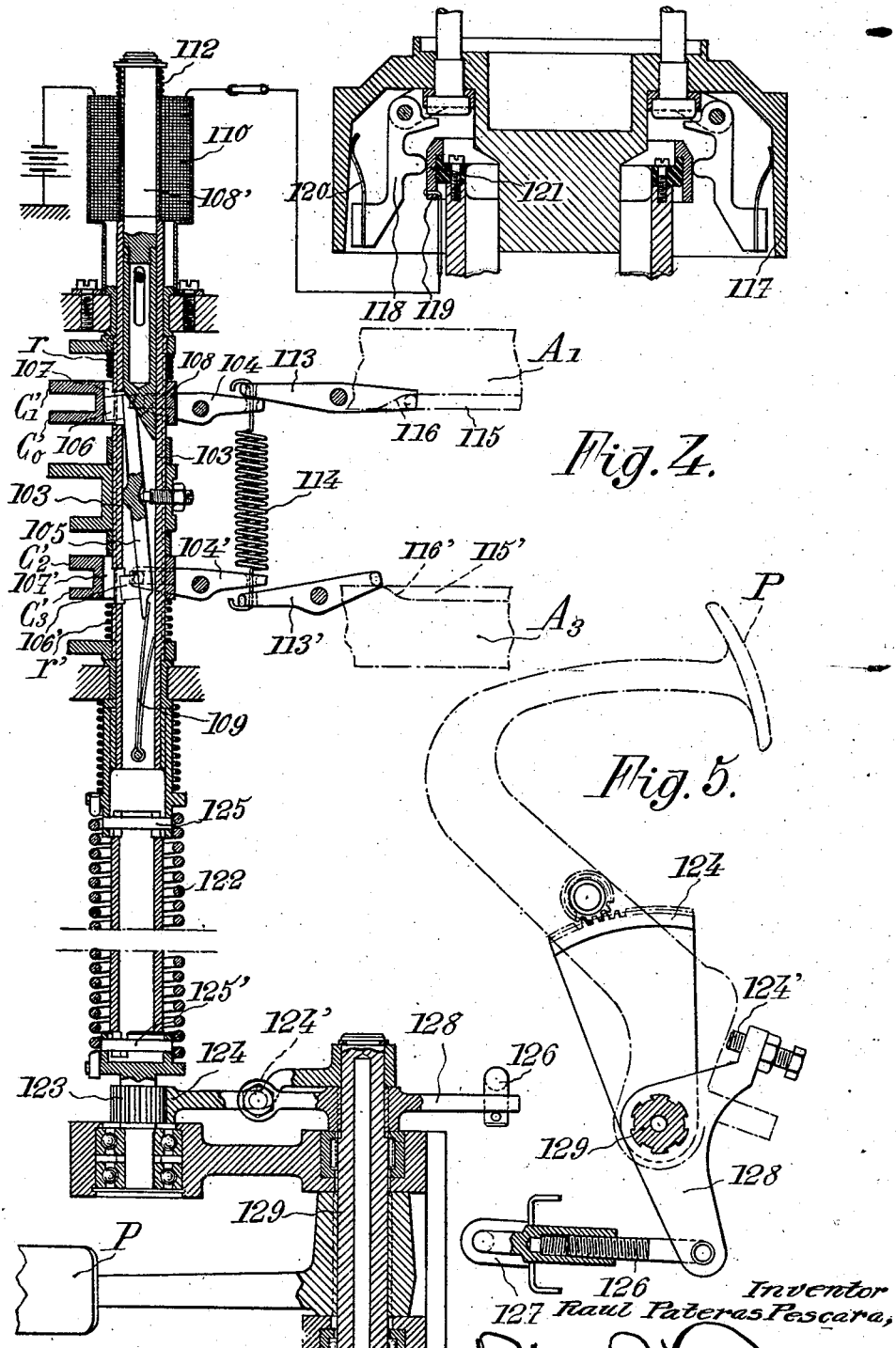

2,293,758

UNITED STATES PATENT OFFICE 2,293,758

GEARBOX

Raul Pateras Pescara, Paris, France

Application May 18, 1938, Serial No. 208,713
In Luxemburg December 22, 1937

21 Claims. (Cl. 192—3.5)

The present invention relates to change speed devices, and in particular, although not exclusively to gear boxes for automobile vehicles.

The invention herein is related to that disclosed in my Patent No. 2,222,913.

The object of the present invention is to provide a mechanism of this kind which is better adapted to meet the requirements of practice than other mechanisms of the same kind made up to the present time.

The essential feature of the present invention consists in devising a gear box in such manner that, at any time during its operation, at least within certain limits, the choice of the most favorable gear ratio, which will have to be used when next changing gears, is automatically effected as a function of at least one of the characteristics of operation, or functional factors of the engine with which this mechanism is cooperating.

According to another feature of the present invention, I interpose, between the control means of the device, on the one hand, and the operating members corresponding to each of the speeds of said device, on the other hand, connecting means of variable speed reduction ratio, these connecting means being such that the highest reduction is obtained for the displacement of said operating members which is to ensure the unlocking of the gear combination in service or the shifting beyond neutral.

Still another feature of the present invention consists in interposing, between this control system and said operating members, a torque limiting device capable, in particular, of preventing the transmission of too high stresses to the operating members in the case of an accidental resistance opposing the shifting into a given gear combination.

Other features of the present invention will result from the following detailed description of some specific embodiments thereof.

Preferred embodiments of the present invention will be hereinafter described, with reference to the accompanying drawings, given merely by way of example, and in which:

Fig. 1 is a diagrammatic view showing, in perspective, a three speed gear box made according to the invention;

Fig. 2 is a vertical sectional view of a part of a gear box made according to another embodiment of the invention;

Fig. 3 is a partial plan view corresponding to Fig. 2;

Fig. 4 is a partial plan view by a horizontal plane;

Fig. 5 shows the control system of this gear box.

In a gear box including a plurality of gear combinations, the use of the best combination depends not only on the speed but also on other factors of operation, such for instance as the ratio of the driving and resisting torques.

There exist automatic gear boxes in which the shifting to another gear combination takes place independently of the will of the driver so that these shiftings may without any inconvenience be very frequent. These gear boxes are generally operated in response to the combination of several factors of working.

Such gear boxes, in addition to their complication, have the disadvantage of wholly eliminating the action of the driver, who is compelled to accept their working characteristics. Now, these characteristics are not always the most agreeable or the most economic. For instance, gear boxes have been devised with a view to obtaining the maximum acceleration when starting, or for picking up under the best possible conditions, or for giving the best possible speed mean with the maximum of economy, and so on. But these devices do not permit of choosing, at any time, the best way of employing the vehicle.

There are also "pre-selection" boxes, in which the choice of the combination to be next employed is always left to the choice of the driver but with the advantage that said driver can, through a preliminary operation, choose in advance the next gear combination he will use. These boxes have, over ordinary gear boxes, the advantage of decomposing, for performing them at different times, the operations of selection and of actual gear shifting, which facilitates the operation, without reducing the number of these operations.

The object of the present invention is to simplify and to reduce the number of operations to be performed for shifting gears, and at the same time of facilitating, for the driver, the choice of the most favorable combination under given circumstances.

According to the chief feature of the present invention, the gear box is adapted, at any time of its working, and at least within certain limits, automatically to prepare in advance the gear shifting into the most favorable combination which will have to be employed, this choice being effected as a function of the characteristics of operation of the vehicle, for instance, as it will be supposed in the following description, as a function of the speed of the vehicle.

It will be readily understood that, with such a box, two gear combinations will be available for the driver under any given value of the speed of the vehicle, to wit the gear combination that is actually being used and the gear combination automatically pre-selected as a function of the speed of the vehicle at this time.

Therefore, it suffices, in order to obtain this "automatic pre-selection" to provide a gear box the general structure is of any conventional type with the following elements:

(a) On the one hand, means for automatically choosing, as a function of the speed of the vehicle at least one group of two gear combinations; and (b) On the other hand, at least one selection device such that, when one of the speeds of this group is in actual operation, the other speed of this group is automatically pre-selected, its actual shifting into play being however left to the control of the driver.

It should be noted that this arangement does not necessarily imply pre-selection in a group of two speeds taking place actually for all speeds of the vehicle.

On the contrary, it may be advantageous, in some cases, to arrange things in such manner that this pre-selection by groups begins to take place only above a certain speed, so that the driver of the vehicle cannot leave, at very low speeds, the gear ratio corresponding to the greatest reduction.

Furthermore, in some cases, when pre-selection concerns several groups of two gear ratios, it may happen that the driver maintains a certain gear combiantion inside a range of speeds for which this ratio should not be used.

In such a case, care should be taken that pre-selection does not take place on the other gear ratio of the group to which the gear ratio actually in operation belongs, but on the most favorable gear ratio of the group which ought normally to be pre-selected at the vehicle speed that is considered, the operation of the control means then shifting into this most favorable gear combination.

As for this control means it should be made, in most cases, in such manner as to include a single control member always actuated in the same manner, whatever be the nature of the gear shifting to be produced, the operating of the gear box proper taking place through the intermediate of a selecting mechanism such that the desired modification of the ratio of transmission is obtained.

Furthermore, it is advantageous to arrange in order that, during the first part of its displacement, the single control member operates a clutch mechanism so as to disconnect the gear box from the engine during the gear shifting.

Although it is possible wholly to eliminate the usual gear box lever, it seems that it is advantageous, in most cases, to keep this lever, as emergency control means or for enabling the driver to make use under special circumstances of a gear ratio different from that prepared by the automatic pre-selecting device.

I will now first describe an example of a gear box having three forward gears and a reverse gear, made according to the present invention.

According to this embodiment, illustrated by Fig. 1, I provide, in the known manner, two bars 1 and 2, disposed side by side and slidable in their frame. These bars are subjected to the action of a gear lever 3, for instance of the swivel type, which can, at will, be engaged either into a notch 4 of lever 1, to obtain first gear or reverse gear, or into a notch 5 provided in lever 2, in order to obtain second or third gear (the arrows indicate the directions of displacement of each bar to shift into the gear combination marked at the end of each of said arrows).

I provide a temporary locking device, such, for instance, as balls 6 subjected to the action of springs 7 tending to apply them into recesses 8 corresponding to the respective gear combinations or to neutral.

Rods 1 and 2 are provided with forks 9 adapted to act, in the known manner, upon the pinions of the gear box. Advantageously, the displacements of rod 1 are of greater amplitude than those of rod 2.

All these elements are those of a conventional gear box.

As the pre-selecting means which will now be described coact with these elements, it is clear that it is particularly easy to adapt them on existing gear boxes since their application does not necessitate any important transformation of the essential elements of said boxes.

These pre-selecting means are then arranged in such manner that they automatically place under the control of a single control member, for instance the clutch pedal 10, one or the other of the bars 1 and 2, and this according to the direction of displacement which is to ensure the passage to the most favorable gear ratio.

This result is obtained in the following manner:

At right angles to the common direction of bars 1 and 2, I provide a shaft 11, capable both of sliding and of rotating in its bearings. This shaft is operatively connected to the clutch control pedal 10 through a lever 12 and a rod 13 provided with a slideway 14 in such manner that pedal 10 can disengage the clutch without modifying the angular position of shaft 11.

Said shaft carries two levers 15 and 15' provided, at their ends, with notches capable of coacting respectively with lugs 16 and 16', respectively, according to the position of shaft 11 along its axis. Lugs 16 and 16' are carried by a pivoting bar 17 the pivot x—y of which is located between said lugs.

Bar 17, which is substantially parallel to shaft 11, is caused to cooperate either with rod 1 or with rod 2, under the control of a relay device operated by a centrifugal device.

For instance, in a longitudinal groove 18 provided in bar 17, I provide a sliding member, such for instance as a carriage 19, advantageously provided with rollers 20.

This carriage is provided with two fingers 21 and 21' capable of engaging in housings 22 (provided in rod 1) or 22' (provided in rod 2) respectively, according to the position of carriage 19.

Bar 17 carries an electro-magnet relay 23 capable of displacing, when it is energized, carriage 19 against the action of a return spring 24 tending to engage finger 21 into housing 22 and thus to connect rod 1 with bar 17.

Electro-magnet 23 is subjected to the action of a centrifugal mechanism 25, for instance of the ball type, the speed of rotation of which is a function of the speed of the vehicle. This mechanism 25 is arranged to close a contact 26 when the speed of the vehicle exceeds a given limit, for instance 6 kilometers per hour. This contact 26 controls the energizing of the electro-magnet by a source of current A, and therefore the movement of carriage 19 toward bar 2 and the operative engagement of said bar 2 with bar 17.

I further provide, according to my invention, a spring 27 which tends to turn shaft 11 away from bar 17, and a spring 28 which tends to bring said shaft, by axial sliding thereof, into the position for which lever 15 is located opposite lug 16.

Furthermore, between bar 17 and shaft 11, I provide means for elastically pushing bar 11 against the action of spring 28 when lever 15 pushes lug 16 and causes bar 17 to pivot. Such means may, for instance consist of an inclined or oblique element 29 carried by bar 17 and adapted to coact with a rocking member 30 for ensuring, through a push piece 31, the compression of a spring 32 which bears against shaft 11. This spring 32 is sufficiently strong for pushing back said shaft 11, when the notch of lever 15 has left lug 16, into the position for which lever 15' is located opposite lug 16'.

Furthermore, I advantageously arrange in order that carriage 19 can slide only when housings 22 and 22' are located opposite each other, this position corresponding to both of the rods 1 and 2 being in neutral position.

Finally, fingers 21 and 21' must be given such shapes, same as the sides of the corresponding housings, that carriage 19 can assume, when bar 17 moves angularly, inclined positions with respect to the common direction of bars 1 and 2.

The above described gear box, including particularly simple pre-selecting means, works in the following manner:

When the vehicle is stopped, electro-magnet 23 is not energized, and carriage 19 is engaged on rod 1. Spring 28 keeps shaft 11 in the position in which lever 15 is located opposite lug 16.

During the first part of its movement, pedal 10 produces the disengagement of the clutch. Then it causes shaft 11 to rotate against the action of spring 27. Lever 15 coacts with lug 16, which causes bar 17 to pivot in the direction corresponding, in view of the position occupied by carriage 19, to passing into first gear. In the course of this movement, oblique member 29 coacts with rocking member 30 so as to compress spring 32. When the driver releases pedal 10, spring 27 causes the end of lever 15 to leave lug 16 and spring 32 causes shaft 11 to slide so as to come into the position for which lever 15' is located opposite lug 16'. If, now, the speed of the vehicle increases until it exceeds the limit value above mentioned, electro-magnet 23 is energized and it tends to bring back carriage 19 into engagement with rod 2, but this movement of the carriage can take place only on the next operation of pedal 10. This operation of pedal 10 first produces a displacement of rod 1 in the opposite direction, since the point 16' of bar 17 that is now being pushed (by lever 15') is now located on the other side of axis $x$—$y$ from point 16. Once bar 1 has come back into neutral position, as housings 22 and 22' are now in line, carriage 19 comes to engage with rod 2 and a further downward movement of pedal 10 will produce the shifting into second gear. Therefore, this shifting had been prepared automatically under the influence of the variation in the vehicle speed, after the passing into first gear.

When the driver releases the pedal after this passing into second gear, as oblique surface 29 no longer pushes rocking member 30, the action of spring 28 becomes preponderating and the whole of shaft 11 is moved in the direction of its axis until lever 15 comes opposite lug 16.

Supposing now that the speed of the vehicle remains higher than the limit value above mentioned, carriage 19 remains engaged with rod 2 and the next operation of pedal 10 will bring about the passing into third gear, with a compression of spring 32, then, when the driver releases said pedal, the return of shaft 11 into the position corresponding to the engagement of lever 15' with lug 16', which corresponds to preparing the shifting into second gear.

Therefore, as long as the speed of the vehicle is above the limit in question, the second and third gears are available, one of said gears being in service and the other one being automatically prepared for the next downward displacement of the pedal.

If, on the contrary, the speed of the vehicle drops below the limit above referred to when the second gear is in action, the action of spring 24 upon carriage 19 becomes preponderating and said carriage comes to engage with rod 1 (which was in neutral position). In this case also, the most favorable speed was automatically prepared.

Advantageously, the above means are completed by the provision of safety means adapted to prevent the shifting into reverse gear otherwise than under the effect of a special action of the driver. Such a safety device is for instance constituted by a locking member 33 which normally opposes the shifting into reverse gear, this locking member being subjected to the action of a spring 34 against the action of which it can be moved away from rod 1 by a push piece 35 housed in notch 4. It suffices for the driver to act on said push piece by means of lever 3 for shifting into reverse gear.

I may also, according to my invention, while complying with the general condition above set forth, desired to obtain that, on the one hand, the shifting from one gear combination to another one ensures the setting into position of the operating members corresponding to the other gear combination which is to be brought into action on the next shifting, and, on the other hand, the operating member of that of these gear combinations which is the most favorable is automatically coupled with the means for controlling the device, the other operating members being disconnected from said controlling means.

Such a result can be obtained with the device shown by Figs. 2 to 5.

The gear box proper can be of any conventional or other type, for instance such that the engagement of the various gear combinations is ensured by the sliding, in opposite directions, of two forks F and F'; the first of which corresponds to reverse gear and first gear, while the other one corresponds to the second and third.

The displacements of these forks are obtained through four rods A0, A1, A2, and A3, slidable along one another. The forks are carried by rods A0 and A2 the displacements of which are respectively conjugated with those of rods A1 and A3 through pinions 101 and 101' the first of which meshes with racks $102_0$ and $102_1$, carried respectively by rods A0 and A1 and the second of which meshes with racks $102_2$ and $102_3$, carried by rods A2 and A3, respectively.

Advantageously, I provide safety means, such as a ball 151 interposed between rods A0 and A2, so as to lock one of these rods in position when the latter has been moved away from its neutral position.

With such an arrangement, it suffices, when it is desired to bring a gear combination into play, to move, always in the same direction, the corresponding rod, to wit rod A0 for reverse gear and rods A1, A2, A3 for the first, second and third forward gears.

For this purpose, I will act on the single control member of the device (for instance a pedal P) which is supposed to ensure also the clutch disengagement.

Now the stroke of this pedal is arranged by taking into account the stress and the displacement that the driver's foot can exert without fatigue. As the effort necessary for operating the change speed device is added to the effort necessary for disengaging the clutch, the total effort required from the driver might be too high, especially at the time of the unlocking of the preceding gear combination employed or when starting from neutral position, that is to say when disengaging the spring ball of the like (as shown at 202 on the drawing) which temporarily maintains this gear combination in operation.

According to an important feature of the present invention, this effort is reduced by interposing, between pedal P and the operating rods A0 to A3 which actuate forks F and F', connecting means with a ratio of reduction which is variable, said means being such that the highest reduction is in play for the movement of pedal P corresponding to the disengagement of the gear combination that is considered.

In the specific embodiment illustrated by the drawings, pedal P acts, preferably through the intermediate of a torque limiting system which will be hereinafter described, on a shaft 103 which carries a plurality of cams the outline of which is such that they ensure the desired reduction.

I provide, between these cams and rods A0 to A3, (a) On the one hand, rocking members B0, B1, B2, B3 to which correspond respectively cams C0 to C3 capable of bringing any of these rods into neutral position, and therefore of ensuring the disengagement of the gear combination that is in service; and (b) On the other hand, rocking members B'0, B'1, B'2 and B'3, to which correspond cams C'0 to C'3, slidable along shaft 103 and adapted to be coupled or uncoupled therewith, in such manner as to be able to cause any of these rods to move with a supplementary displacement which ensures the engagement of a new combination.

The axes of said rocking members are carried, respectively, by rods of corresponding digits (for instance rod A0 for rocking members B0 and B'0 and these rocking members are advantageously urged toward their lower position by springs such as 152.

Cams C0 to C3 are keyed on shaft 103 opposite the corresponding rocking members, cams C0 and C2 being for instance carried by a common sleeve.

Preferably, cams C'0 and C'1 on the one hand, and cams C'2 and C'3 on the other hand, are carried by two sleeves capable of sliding along shaft 103, the space between two cams carried by the same sleeve being such that, when one of said cams is located opposite the corresponding rocking member, that is to say occupies a position which, in what follows, will be called "active position," the other cam occupies a position (which will be called "neutral position") in which it is not located opposite its own rocking member.

Cams C'0 to C'3 are then keyed in positions such that they act only after rods A0 to A3 have been brought into neutral position by cams C0 to C3.

Of course, some group of two cams, for instance C'2 and C'3, can be replaced by a single cam. In this case it would suffice to provide axial displacements of said cam such that it could be brought opposite one or the other of the rocking members B'2 and B'3.

Finally, this mechanism is completed by providing means for controlling cams C'0 to C'3, that is to say, in other words, means through which it is possible, on the one hand to slide said cams against the action of return springs r and r', and, on the other hand, to key them angularly on shaft 103.

Such means may be provided as follows:

Two forks 104 and 104' are arranged to coact respectively with the sleeve carrying cams C'0 and C'1 on the one hand, and cams C'2 and C'3 on the other hand.

Inside the shaft 103, there is provided a kind of bar 105 on the ends of which are provided keys 106 and 106', each of which is adapted either to be wholly retracted on the inside of said shaft, or to project therefrom into respective grooves 107 and 107' provided in each of said sleeves. This oscillating bar 105 is controlled by a push piece 108 having an inclined or wedge-shaped end adapted to cooperate with one of the ends of bar 105, while the other end of said bar is subjected to the antagonistic action of a return spring 109.

I further provide fixed abutments, such as 201 capable of producing the lifting of rocking members B'0 to B'3 in the course of their backward movement, so that these members can finish this backward movement by passing above shaft 103.

By causing to coact with the twin cams C'0, C'1 and C'2, C'3, means adapted to prevent axial displacements of said cams at least during the first part of the working of the gear box for shifting from one gear combination to another one (this first part corresponding to coming back into neutral) when these cams occupy a position for which spring r or r' is compressed, which means may be constituted, for instance, by providing said cams with collars such as 203 adapted to coact with lateral abutments 204 during the whole rotation of said cams, these abutments ceasing to stop said collars only when the corresponding cams have come back to their initial angular position, that is to say when the driver ceases to act upon pedal P.

Furthermore, the system is arranged in such manner that:

(a) On the one hand, forks 104 and 104', which operate the sliding cams, are controlled, when bringing a gear combination into play, in such manner as to bring into active position that of the cams which corresponds to the combination which is to be brought into action on the next gear changing; and (b) On the other hand, push piece 108 is automatically controlled as a function of the speed of the vehicle and this in such manner that it ensures the keying on shaft 103 of the cam corresponding to the most favorable gear combination.

In this way, the next time the driver depresses pedal P, the most favorable gear combination is brought into action.

Although, taking into account the above explanations, it is possible to proceed in many different ways for establishing an automatic preselection control mechanism of this kind, it seems that it is more particularly advantageous to employ the arrangement illustrated by Figs. 2 to 5.

In this case, a core 108' rigid with push piece 108 is acted upon by a solenoid 110 to which energizing current is sent through the intermediate of a centrifugal device such that, when the speed of the vehicle drops below a given speed limit, for instance 6 kms. per hour, said electromagnet is energized and causes push-piece 108 to move, under the action of an elastic system such as a spring 112, in the direction in which it causes cams C'0 and C'1 to be keyed on shaft 103, the displacement of said push piece in the opposite direction, under the action of spring 112, having for its effect to release said cams and to permit the keying of cams C'2 and C'3 on shaft 103, under the action of spring 109.

Two rocking members 113 and 113' act on forks 104, 104', in such manner that the oscillation of said rocking members causes said forks to move angularly and therefore to modify the positions of the sleeves which carry the sliding cams, said sleeves being subjected to the action of return springs $r$ and $r'$.

The ends of rocking members 113 and 113' which are located opposite the ends of forks 104 and 104' are then connected together by a spring 114, of a strength greater than that of each of the springs $r$ and $r'$, tending to bring said rocking members into contact with said forks. These rocking members bear, through their other ends, respectively on guiding surfaces 115 and 115' carried by two rods which correspond respectively to fork F and to fork F', for instance rods A1 and A3.

Finally, I provide each of these guiding surfaces with inclined or cam portions 116 and 116' which comply with the following conditions:

Supposing, as shown by the drawings, that all the rods A0 to A3 are in neutral position (and if they were not in this position, the first part of the displacement of pedal P would have for its effect to bring them into this position through the action of some of the cams C0 to C3), then:

(a) On the one hand, inclined surface 116 must not act upon rocking member 113, the end of which will thus be able to come into contact with fork 104 and to produce a displacement of the sleeve carrying cam C'1 such that the last mentioned cam comes into active position, that is to say opposite rocking member B'1; and (b) On the other hand, inclined surface 116' must coact with rocking member 113' in such manner as to keep it at a distance from fork 104', the latter then allowing cam C'2 to come opposite rocking member B'2 under the action of spring $r'$.

The operation of such a mechanism is the following:

On the first action exerted on pedal P, the vehicle being supposed to be stationary, the first gear is brought into action as a consequence of the fact that key element 106 projects through the corresponding slot and that cam C'1 is kept opposite rocking member B'1 by the action of spring 114.

On the next action, if the speed of the vehicle has exceeded 6 kms. per hour, key member 106 will have been retracted and key 106' brought into projecting position. Therefore, cam C'2 will coact with rocking member B'2 so as to bring the second gear into play (the beginning of the operation has brought back rods A0 to A3 into neutral positions).

Now, the displacement of rod A2 resulting from the engagement of the gears corresponding to the second gear combination will have produced a displacement of rod A3 in the opposite direction. Therefore, inclined surface 116' ceases to retain rocking member 113', which, under the action of spring 114, can then coact with fork 104' so as to compel cam C'3 to come, against the action of spring $r'$, opposite rocking member B'3 once the driver has ceased to act upon pedal P. The third gear combination has thus been automatically prepared and the next action on the pedal has for its effect to bring this gear combination into play, since said cam C'3 is maintained in active position, after the passage through neutral position, by the action of abutment 204 on flange 203. When the third gear is in action, inclined surface 116' again occupies the position shown by the drawings and spring $r'$ tends to bring back cam C'2 opposite rocking member B'2 and therefore to ensure pre-selection of second gear.

As soon as the driver will have released pedal P, abutment 204 will release cam C'2 which, coming into position opposite rocking member B'2, ensures pre-selection of the second gear.

Below the limit speed, the same alternation takes place for the group of gear combinations including reverse gear and first gear. If it is desired to obtain reverse gear directly, it suffices to act twice on pedal P.

It will be noted that, if second gear is in action below the limit speed, that speed that is pre-selected is the first gear as a consequence of the fact that key 106' has released the double cam C'2, C'3, while key 106 has come to project into the groove 107 carried by the double cam C'0, C'1.

Finally, in all cases in which any combination is engaged, the vehicle being stationary, the fact of bringing back the parts into neutral (which necessarily precedes the starting of the engine) has for its effect to bring all the parts of the mechanism above described into the initial position that was considered, from which position automatic pre-selection is effected as above explained.

I have thus provided a change speed device of the "pre-selection type," in which the pre-selection of the speeds is effected by groups as soon as the action of the centrifugal device exerts itself.

Concerning this centrifugal device, it may be, as shown by Fig. 4, disposed on the inside of a rotating element of the system of transmission of the vehicle, for instance on the inside of a brake drum 117.

This centrifugal device consists essentially of masses 118, fed with current through conductors 119 and capable either of coming, under the action of springs 120, into contact with a collecting ring 121, electrically connected to electro-magnet 110, through conductor 119, or, on the contrary, when the speed of the vehicle exceeds 6 kms. per hour, of moving away from said ring under the effect of the centrifugal force and against the action of said springs, thus ensuring the breaking of the energizing circuit of said electro-magnet.

Concerning now the torque limiting device to be interposed between pedal P and the box control mechanism above described, it may be made in various ways and for instance as follows:

I connect with shaft 103 one end of a torsional spring 122 the other end of which is secured to a pinion 123 subjected to the action of a toothed sector 124 preferably driven through the intermediate of an adjustable abutment 124' by pedal P.

I further provide means for keeping spring 122 tensioned, these means consisting for instance of keys 125 and 125', at least one of which, for instance key 125' can move angularly in its housing.

In this way, said spring can transmit without deflection a limit torque equal, for instance, to twice the torque that is normally required. If this limit torque is exceeded, the spring yields and pedal P can be fully depressed, owing to the angular displacement of key 125'.

It is further possible to reduce the reaction of the clutch springs on pedal P at the end of the stroke of the latter, by arranging the clutch control in such manner that it is effected through the intermediate of a lever 126 having one of its ends linearly guided for instance by an elongated eye 127 and its other end pivoted to piece 128 (which turns together with pedal P) which carries the adjustable abutment 124.

In this way, the pressing down of the pedal P has for its effect to move lever 126 nearer to the pivot axis of said pedal, and therefore of reducing the reaction of the clutch springs.

It should be noted that, in the usual gear boxes, it is generally not necessary that the driver should fully disengage the clutch for shifting gears. It is therefore possible to adjust abutment 124' in such manner (for instance by means of a control device placed within reach of the driver) that shaft 103 is acted upon before the end of the clutch disengagement, which correspondingly reduces the effort to be exerted by the driver for ensuring the engagement of the speed combinations.

The chief advantages of the gear box above described are the following:

It complies with all the requirements for a good running of the vehicle, while reducing to a minimum the action of the driver;

It is simple and can well be adapted to existing gear boxes.

In a general manner, while I have, in the above description, disclosed what I deem to be practical and efficient embodiments of the present invention it should be well understood that I do not wish to be limited thereto as there might be changes made in the arrangement, disposition and form of the parts without departing from the principle of the present invention as comprehended within the scope of the appended claims.

What I claim is:

1. In connection with an automobile vehicle having an engine, a gear box, with at least two groups each of two speed ratios, including reverse, associated with said engine and provided with movable control means for bringing the respective gear combinations into service, and a clutch, a system of the type described, which comprises, in combination, an operating member, means interposed between said member and said clutch, for causing said member, during the first part of its movement away from its position of rest, to disengage said clutch, a pre-selecting device including a shaft angularly movable in response to displacements of said member, a plurality of cams keyed in fixed position on said shaft, rocking members carried by each of said gear box control means adapted to cooperate with said cams so as to bring said control means into neutral position upon said displacement of said shaft control member, a plurality of cams both slidable and rotatable on said shaft, rocking members carried by each of said gear box control means adapted to cooperate with said last mentioned cams, these last mentioned cams being axially interconnected in groups of two, with a distance between them different from the distance between the corresponding rocking members, means operative by the displacement of the active gear box control means for alternately moving in the axial direction the group of the last mentioned cams to which belongs the cam in action, so that the other cam of said group is brought opposite its rocking member immediately upon the operation of said first mentioned cam, and means, operative by speed variations of the vehicle, for keying one or the other of said groups of movable cams on said shaft according to the speed at which the vehicle is moving.

2. A system according to claim 1 in which said cams are so shaped as to give a ratio of transmission variable in the course of their rotation so that the reduction is greater at the beginning of the movement.

3. A system according to claim 1 in which said shaft is hollow and said means for keying one of said groups of movable cams thereon consist of a bar mounted in an oscillating manner in said shaft.

4. A system according to claim 1 in which the two cams of each group of movable cams are rigidly assembled together upon a sleeve provided with a longitudinal slot, the shaft being hollow and provided with corresponding slots, the means for keying one of said groups of movable cams on said shaft consisting of a bar pivotally mounted in said shaft, and projections carried by said bar adapted to engage in said slots, alternately.

5. A system according to claim 1 in which said shaft is hollow and the means for keying said groups of movable cams to said shaft include a bar mounted in an oscillating manner in said shaft, a push piece movable in said shaft acting on said bar a centrifugal governor moving at the same speed as a rolling part of said vehicle, and electric means governed by said governor for operating said push piece.

6. A system according to claim 1 further including torque limiting means interposed between said operating member and said shaft.

7. A system according to claim 1 further including abutment means adapted to cooperate with said first mentioned rocking members for lifting them above the corresponding fixed cams during the operation, so as to permit the free working of the other cams.

8. A system according to claim 1 in which the movable cams are fixed at an angle to the corresponding fixed cams so as to act after them.

9. A system according to claim 1 further including fixed flanges adapted to cooperate with said movable cams for limiting their axial displacements in given angular positions thereof.

10. In combination with an automobile vehicle having an engine, a variable speed transmission mechanism comprising at least two groups of speed ratio transmitting means, each group containing speed ratio transmitting means adapted to provide two different speed ratios, a first means operatively connecting the transmission mechanism to the engine, said first connecting means including a clutch, control means comprising an operating member, a second means operatively connecting said operating member and said clutch whereby said member during the first part of its movement away from normal position operates said clutch, a third means for connecting said operating member to said groups, said third connecting means including a preselecting device for selecting one of said groups, means responsive to variations in the speed of the vehicle to operate said preselecting device whereby at least for said one group selected said operating member during the latter part of its movement away from its normal position operates to move said preselecting device to engage one of the speed ratio transmitting means of said group, and means operated by the aforesaid displacement of the operating member to engage said one speed ratio transmitting means to set said third connecting means in position to engage the other speed ratio transmitting means of said group upon the next operation of said operating member.

11. In combination with an automobile vehicle having an engine, a variable speed transmission mechanism comprising at least two groups of speed ratio transmitting means, each group containing speed ratio transmitting means adapted to provide two different speed ratios, a first means operatively connecting the transmission mechanism to the engine, said first connecting means including a clutch, control means comprising an operating member, a second means operatively connecting said operating member and said clutch whereby said member during the first part of its movement away from normal position operates said clutch, a third means for connecting said operating member to said groups, said third connecting means including a preselecting device for selecting one of said groups, said preselecting device including a plurality of force transmitting members each adapted to cooperate with one of said groups, means responsive to variations in the speed of the vehicle to operate said preselecting device to connect one of said force transmitting members operatively to one of said groups whereby at least for said one group selected said operating member during the latter part of its movement away from its normal position operates to move said preselecting device to engage one of the speed ratio transmitting means of said group, and means operated by the aforesaid displacement of the operating member to engage said one speed ratio transmitting means to set said third connecting means in position to engage the other speed ratio transmitting means of said group upon the next operation of said operating member.

12. In combination with an automobile vehicle having an engine, a variable speed transmission mechanism comprising at least two groups of speed ratio transmitting means, each group containing speed ratio transmitting means adapted to provide two different speed ratios, including reverse, associated with the engine, and a clutch, movable control members one for each of said groups, an operating member, a first means operatively connecting said operating member and said clutch whereby said member during the first part of its movement away from normal position operates said clutch, a second means for connecting said operating member to said control members, said second means including a preselecting device including a plurality of force transmitting members each adapted to cooperate with one of said control members, means responsive to variations in the speed of the vehicle to operate said preselecting device whereby at least for said one group selected said operating member during the latter part of its movement away from its normal position operates to move said preselecting device to engage one of the speed ratio transmitting means of said group, and means operated by the aforesaid displacement of the operating member to engage said one speed ratio transmitting means to set said second connecting means in position to engage the other speed ratio transmitting means of said group upon the next operation of said operating member.

13. A system according to claim 12 in which said second connecting means includes a bar pivoted about an axis, said force transmitting members being mounted on said bar and movable to cooperate with either of said control members so as to be able to move each of them in either of two opposed directions, two lugs carried by said bar on either side of said axis, a shaft both slidable and rotatable connected with said operating member, two levers fixed to said shaft at a distance between said lugs, and means, operative by each rotation of said shaft for angularly displacing said levers, for axially moving said shaft so as to bring alternately each of said levers opposite one of the lugs.

14. A system according to claim 12 in which said second connecting means includes a bar pivoted about an axis, said force transmitting members being mounted on said bar and movable to cooperate with either of said control members so as to be able to move each of them in either of two opposed directions, two lugs carried by said bar on either side of said axis, a shaft both slidable and rotatable connected with said operating member, two levers fixed to said shaft at a distance between said lugs, and means, operative by each rotation of said shaft for angularly displacing said levers, for axially moving said shaft so as to bring alternately each of said levers opposite one of the lugs, a carriage slidable along said bar in response to speed variations of the vehicle, said force transmitting members being mounted on said carriage.

15. In combination with an automobile vehicle having an engine, a variable speed transmission mechanism comprising at least two groups of speed ratio transmitting means, each group containing speed ratio transmitting means adapted to provide two different speed ratios, including reverse, associated with the engine, and a clutch, movable control members one for each of said groups, an operating member, a first means operatively connecting said operating member and said clutch whereby said member during the first part of its movement away from normal position operates said clutch, a second means for connecting said operating member to said control members, said second means including a preselecting device for selecting one of said groups, said preselecting device including a shaft angularly movable in response to displacements of said operating member, a plurality of cams fixed on said shaft, elements carried by each of said control members adapted to cooperate with said cams so as to bring said control members into neutral position upon displacement of said shaft by said operating member, a plurality of cams both slidable and rotatable on said shaft, elements carried by each of said control members adapted to cooperate with said last mentioned cams, means operative by the displacement of one of the control members for moving axially those of the last mentioned cams corresponding to one of the speed ratio transmitting means of that group to which the cam in action belongs, so that the other cam of said group is moved into a position ready to act upon the other speed ratio transmitting means of said group immediately upon the operation of said first mentioned cam, and means, operative by speed variations of the vehicle, for keying one or the other of said groups of movable cams on said shaft according to the speed at which the vehicle is moving.

16. A system according to claim 15, in which the two cams of each group of movable cams are rigidly assembled together upon a sleeve provided with a longitudinal slot, the shaft being hollow and provided with corresponding slots, the means for keying one of said groups of movable cams on said shaft consisting of a bar pivotally mounted in said shaft, and projections carried by said bar adapted to engage in said slots, alternately.

17. In combination with an engine and a variable speed transmission mechanism having means to provide at least two groups of speed ratio transmitting means, of which at least one group contains two force transmitting means adapted to provide two different speed ratios, means to preselect automatically at least one group of said speed ratio transmitting means which contains at least two speed ratio transmitting means, said preselecting means being responsive automatically to variations in the speed of the vehicle by the engine, driver-operable control means for alternately engaging one or the other of the speed ratio transmitting means of said preselected group, and torque limiting means interposed between said driver-operable control means and said transmission mechanism.

18. In combination with a vehicle including an engine and a variable speed transmission having at least three forward and one reverse speed ratio transmitting means connected to the engine and to the vehicle for driving the vehicle, said speed ratio transmitting means being composed of two groups one of which comprises a low forward speed ratio transmitting means and reverse speed ratio transmitting means, and the other of which comprises two higher forward speed ratio transmitting means, means to preselect automatically one group of said speed ratio transmitting means which contains at least two speed ratio transmitting means; said preselecting means being responsive automatically to variations in the speed of the vehicle, and driver-operable control means for alternately engaging one or the other of the speed ratio transmitting means of a preselected group, and torque limiting means interposed between said driver-operable control means and said transmission mechanism.

19. In combination with an engine, a variable speed transmission mechanism having means to provide at least two groups of speed ratio transmitting means, of which at least one group contains speed ratio transmitting means adapted to provide two different speed ratios, and a clutch between said engine and said transmission mechanism, means to preselect automatically at least one group of said speed ratio transmitting means which contains at least two speed ratio transmitting means, said preselecting means being responsive automatically to variations in the speed of the vehicle, driver-operable control means for said clutch, and means operable by said control means for alternately engaging one or the other of the speed ratio transmitting means of said preselected group.

20. In combination with an automobile vehicle having an engine, a variable speed transmission mechanism comprising at least two groups of speed ratio transmitting means, each group containing speed ratio transmitting means adapted to provide two different speed ratios, including reverse, associated with the engine, movable control members one for each of said groups, an operating member, a first means operatively connecting said operating member and said clutch whereby said member during the first part of its movement away from normal position operates said clutch, a second means for connecting said operating member to said control members, said second means including a preselecting device including a plurality of force transmitting members each adapted to cooperate with one of said control members, means responsive to variations in the speed of the vehicle to operate said preselecting device whereby at least for said one group selected said operating member during the latter part of its movement away from its normal position operates to move said preselecting device to engage one of the speed ratio transmitting means of said group, and means in position operated by the aforesaid displacement of the operating member to engage said one speed ratio transmitting means to set said second connecting means to engage the other speed ratio transmitting means of said group upon the next operation of said operating member.

21. In combination with an automobile vehicle having an engine, a variable speed transmission mechanism comprising at least two groups of speed ratio transmitting means, each group containing speed ratio transmitting means adapted to provide two different speed ratios, including reverse, associated with the engine, movable control members one for each of said groups, an operating member, a first means operatively connecting said operating member and said clutch whereby said member during the first part of its movement away from normal position operates said clutch, a second means for connecting said operating member to said control members, said second means including a preselecting device for selecting one of said groups, said preselecting device including a shaft angularly movable in response to displacements of said operating member, a plurality of cams fixed on said shaft, elements carried by each of said control members adapted to cooperate with said cams so as to bring said control members into neutral position upon displacement of said shaft by said operating member, a plurality of cams both slidable and rotatable on said shaft, elements carried by each of said control members adapted to cooperate with said last mentioned cams, means operative by the displacement of one of the control members for moving axially those of the last mentioned cams corresponding to one of the speed ratio transmitting means of that group to which the cam in action belongs, so that the other cam of said group is moved into a position ready to act upon the other speed ratio transmitting means of said group immediately upon the operation of said first mentioned cam, and means, operative by speed variations of the vehicle, for keying one or the other of said groups of movable cams on said shaft according to the speed at which the vehicle is moving.

RAUL PATERAS PESCARA.